(12) United States Patent
Watanabe et al.

(10) Patent No.: US 9,841,103 B2
(45) Date of Patent: Dec. 12, 2017

(54) METAL GASKET

(71) Applicant: NOK Corporation, Tokyo (JP)

(72) Inventors: Takeshi Watanabe, Fukushima (JP); Kazuya Aihara, Fukushima (JP); Isao Tanji, Fukushima (JP); Shinya Nakaoka, Shizuoka (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 15/049,551

(22) Filed: Feb. 22, 2016

(65) Prior Publication Data

US 2016/0305548 A1   Oct. 20, 2016

(30) Foreign Application Priority Data

Feb. 24, 2015 (JP) .................................. 2015034597

(51) Int. Cl.
  *F16J 15/08* (2006.01)
  *F16J 15/12* (2006.01)

(52) U.S. Cl.
  CPC ....... *F16J 15/0881* (2013.01); *F16J 15/0806* (2013.01); *F16J 15/0818* (2013.01); *F16J 15/122* (2013.01); *F16J 2015/085* (2013.01); *F16J 2015/0856* (2013.01)

(58) Field of Classification Search
  CPC .... F16J 15/122; F16J 15/0818; F16J 15/0806; F16J 15/085; F16J 15/0856; F16J 15/0887
  See application file for complete search history.

(56) References Cited

U.S. PATENT DOCUMENTS 1,851,948 A * 3/1932 Summers ............... F16J 15/122
  277/606
4,759,556 A * 7/1988 Udagawa ............. F16J 15/0818
  277/595

(Continued)

FOREIGN PATENT DOCUMENTS

JP    10318373    4/1998
JP    2000356267   12/2000

(Continued)

*Primary Examiner* — Eugene G Byrd
(74) *Attorney, Agent, or Firm* — K. David Crockett, Esq.; Niky Economy Syrengelas, Esq.; Crockett & Crockett, PC (57) ABSTRACT

An object is to provide a metal gasket that can form a wide contact width for a counterpart sealing face and that can achieve excellent sealing properties even when a blow hole is generated in the counterpart sealing face, and the object is achieved by a metal gasket having a bead portion to be in contact with a counterpart sealing face to form a sealing portion, formed on a gasket main body. The bead portion includes an arc portion that is convex toward the counterpart sealing face and hem-rising portions that each obliquely rise from the gasket main body toward the arc portion, on both hems of the arc portion. A connection portion between the arc portion and the hem-rising portion is formed to be convex toward a convex side of the bead portion. Plastic distortion for an overall width of the arc portion is lower than that of the connection portion. A contact pressure distribution in the arc portion in a compression state has a shape that is flat and wide in a width direction of the arc portion.

6 Claims, 12 Drawing Sheets

(56) References Cited

U.S. PATENT DOCUMENTS

| | | | | |
|---|---|---|---|---|
| 4,765,634 A * | 8/1988 | Kobayashi | ........... | F16J 15/0818 |
| | | | | 277/595 |
| 5,004,250 A * | 4/1991 | Udagawa | ............. | F16J 15/0818 |
| | | | | 277/595 |
| 5,570,892 A * | 11/1996 | Udagawa | ............. | F16J 15/0818 |
| | | | | 277/595 |
| 5,997,008 A * | 12/1999 | Pflug | ................... | F16L 19/0218 |
| | | | | 277/608 |
| 6,247,704 B1 * | 6/2001 | Battistoni | .............. | F16J 15/122 |
| | | | | 277/592 |
| 2002/0127411 A1 * | 9/2002 | Murakami | .............. | B32B 15/06 |
| | | | | 428/423.9 |
| 2003/0011140 A1 * | 1/2003 | Murakami | ........... | F16J 15/0818 |
| | | | | 277/593 |
| 2003/0230858 A1 * | 12/2003 | Matsuki | ............... | F16J 15/0818 |
| | | | | 277/594 |
| 2005/0110222 A1 * | 5/2005 | Matsumoto | ............ | F02F 11/002 |
| | | | | 277/592 |
| 2008/0211197 A1 * | 9/2008 | Abe | ..................... | F16J 15/0818 |
| | | | | 277/653 |
| 2012/0153579 A1 * | 6/2012 | Nakaoka | .............. | F16J 15/0818 |
| | | | | 277/644 |
| 2015/0076771 A1 * | 3/2015 | Stout | ...................... | B21D 13/00 |
| | | | | 277/595 |
| 2015/0204270 A1 * | 7/2015 | Davidson | ............... | B23K 26/20 |
| | | | | 277/593 |

FOREIGN PATENT DOCUMENTS

| | | |
|---|---|---|
| JP | 2003322257 | 11/2003 |
| JP | 201194667 | 5/2011 |

* cited by examiner

(Comparactive Example 1)

(Comparative Example 2)

Fig. 10a

Comparative Example 2    low ←— Plastic distortion —→ high

METAL GASKET

TECHNICAL FIELD

The present invention relates to a metal gasket and, more particularly, to a metal gasket that can form a wide contact width for a counterpart sealing face and that can achieve excellent sealing properties even when a blow hole is generated in the counterpart sealing face.

BACKGROUND

The cases where products are assembled using casting materials have increased in many industrial fields including the automobile industry. For example, cast components produced using aluminum die-casting are used as, for example, automobile parts such as an engine.

In a cast component, voids among the particles may remain inside the component even after the sinter-molding resulting in formation of blow holes. The texture is dense in the portion close to the surface of the cast component and no blow hole is therefore exposed. The cast component may however be finished by cutting to improve its dimensional precision and its flatness after the molding and, in this case, the blow holes inside the cast component may be exposed in the surface by the cutting to form recesses caused by the blow holes.

When such recesses are formed in the counterpart sealing face of a gasket, a problem arises that the sealing properties by the gasket cannot sufficiently be achieved. In the gasket, a bead portion is deformed to be crushed by being compressed by bolt axial forces between two members and the stress generated in the bead portion at this time seals the counterpart sealing face. In this case, when a recess is present to extend over the contact face with the bead portion, the fluid to be hermetically accommodated may leak through the recess.

Countermeasures are taken against this problem such as hermetically sealing a gap between the counterpart sealing face and the gasket by applying a resin or a liquid rubber (FIPG) to the counterpart sealing face, and changing the cast component itself to a component having a configuration with less influence of the blow holes. With the downsizing and weight reduction of the products in recent years, however, product shapes difficult to mold have increased resulting in the difficulty in the work to control the blow holes for the cast components. Application of ideas to the gasket itself is therefore also demanded as the countermeasures against the blow holes.

Such sealants have traditionally been proposed as a sealant whose clamping width is made even by disposing a recess in a portion of the circumference of its cross section to prevent the twisting and the like generated during the attachment (Japanese Laid-Open Patent Publication No. 10-318373), a sealant whose cross section is set to have a trifurcate shape to facilitate reduction of the load, reduction of fluctuation of the load, and the like (Japanese Laid-Open Patent Publication No. 2000-356267), and a sealant whose cross section is set to have a trifurcate shape to facilitate improvement of the attachment property, improvement of stability of the posture for attachment, and the like (Japanese Laid-Open Patent Publication No. 2003-322257). However, as far as these sealants are concerned, nothing is taken into consideration for these sealants concerning the countermeasures against the case where the condition of the counterpart sealing face is degraded due to the formation of the recesses by the blow holes, and the like.

Gaskets have been proposed each as a gasket for which a countermeasure has been taken against the degraded condition of the counterpart sealing face (Japanese Laid-Open Patent Publication Nos. 2003-322257 and 2011-94667) that are each enabled to cover the protrusions and recesses by forming a wide contact width for the counterpart sealing face by forming an arc portion having a small curvature and having a shape convex toward the counterpart sealing face that has a recess formed therein. These gaskets are however each formed by a rubber-like elastic body and are each not a metal gasket having a bead portion formed on a metal substrate.

PRIOR ART DOCUMENTS

Patent Documents

Patent Document 1: JP-A-H10-318373
Patent Document 2: JP-A-2000-356267
Patent Document 3: JP-A-2003-322257
Patent Document 4: JP-A-2011-94667

SUMMARY OF THE INVENTION

Problem to be Solved by the Invention

An object of the present invention is to provide a metal gasket that can form a wide contact width for a counterpart sealing face and that can achieve excellent sealing properties even when blowholes are produced in the counterpart sealing face.

Other objects of the present invention will be apparent in the following description.

Means for Solving Problem

The objects will be achieved by the following inventions.
1. A metal gasket comprising a bead portion to be in contact with a counterpart sealing face to form a sealing portion, formed on a gasket main body, wherein
   the bead portion comprises an arc portion that is convex toward the counterpart sealing face, and hem-rising portions that obliquely rise from the gasket main body toward the arc portion, on both hems of the arc portion, wherein
   a connection portion between the arc portion and the hem-rising portion is formed to be convex toward a convex side of the bead portion, wherein
   plastic distortion of an overall width of the arc portion is lower than the plastic distortion of the connection portion, and wherein
   a contact pressure distribution in the arc portion in a compression state has a shape that is flat and wide in a width direction of the arc portion.
2. The metal gasket according to 1, wherein
   the bead portion is formed on each of both sides of the gasket main body, and is in contact with the counterpart sealing face arranged in each of the sides of the gasket main body to form the sealing portion.
3. The metal gasket according to 1 or 2, wherein
   an interval between the connection portions formed on both sides of the arc portion is the range of 0.4 mm to 10 mm.
4. The metal gasket according to 1, 2, or 3, wherein
   a curvature radius of the arc portion is the range of 2 mm to 20 mm.

5. The metal gasket according to any one of 1 to 4, wherein
a length per one side of the hem-rising portion is the range of one sixth to one third of an overall width of the bead portion.

6. The metal gasket according to any one of 1 to 5, wherein the gasket main body is coated with an elastic substance.

Effect of the Invention

According to the present invention, the metal gasket can be provided, that can form a wide contact width for a counterpart sealing face and that can achieve excellent sealing properties even when blow holes are produced in the counterpart sealing face.

DESCRIPTION OF THE PREFERRED EMBODIMENTS

Embodiments of the present invention will be described with reference to the drawings.

First Embodiment

Figure 1:
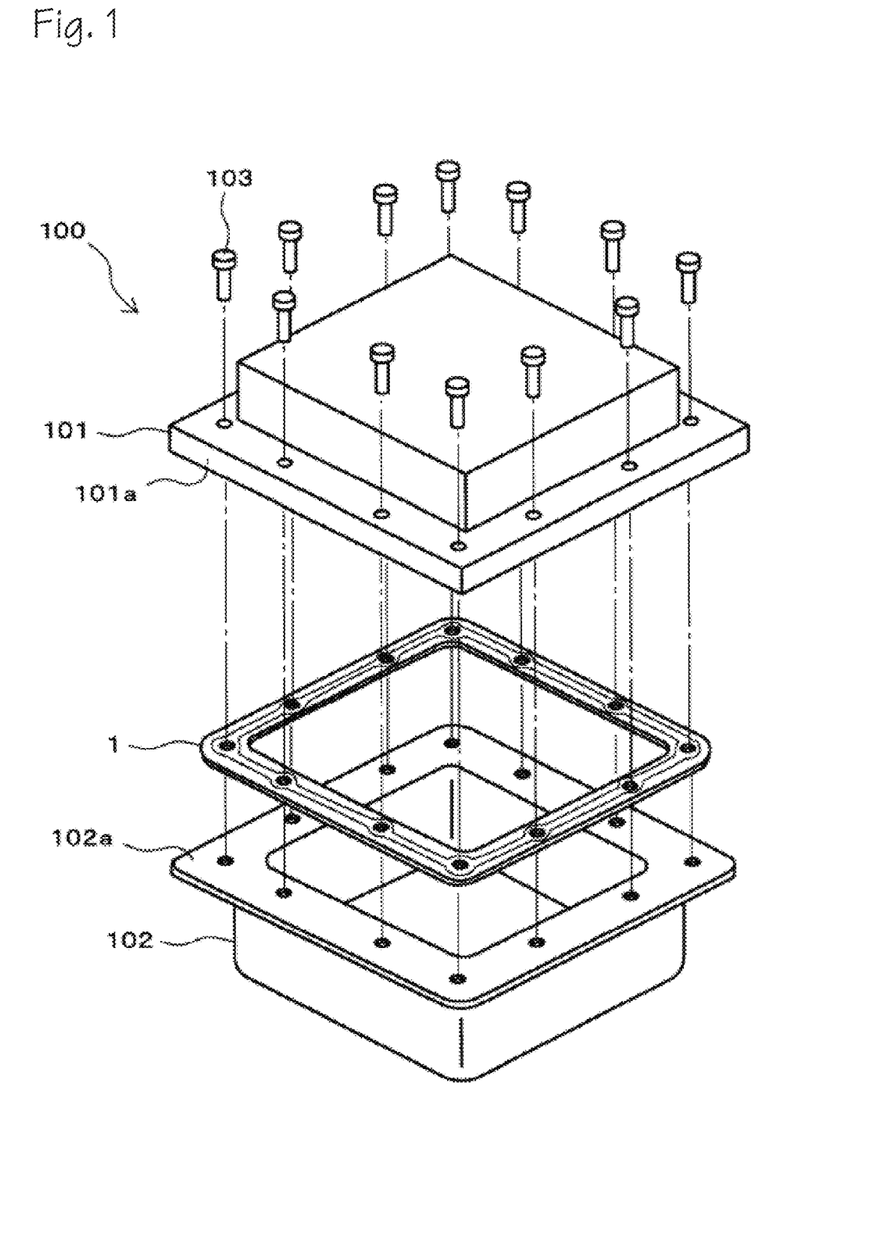
FIG. 1 is an exploded perspective diagram of a housing to which a metal gasket according to a first embodiment of the present invention is applied.
Figure 2:
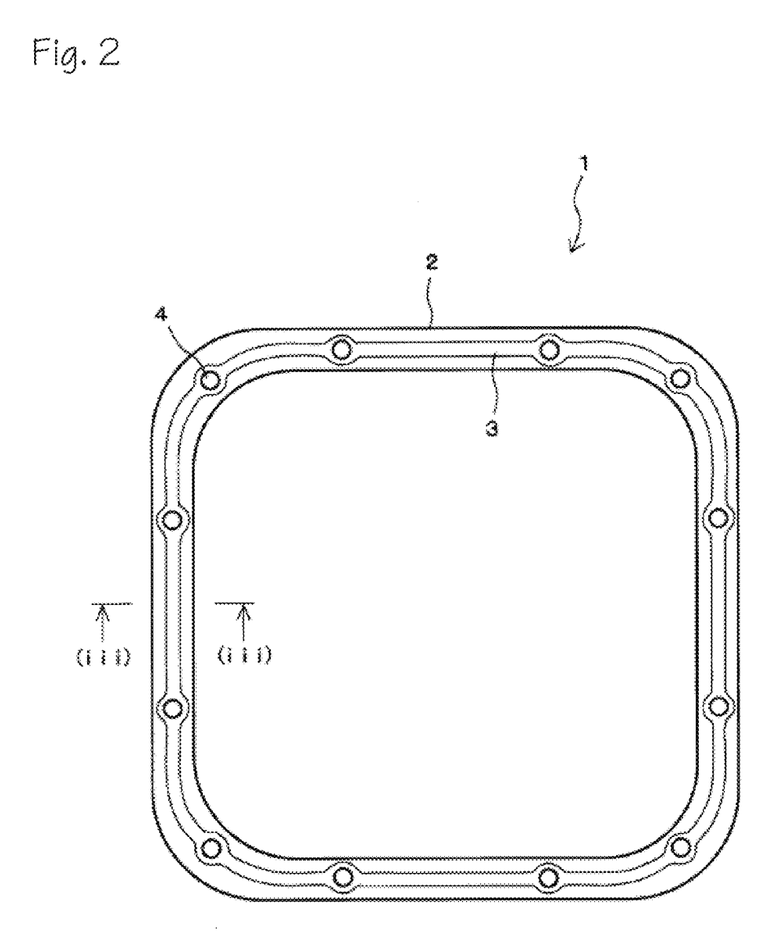
FIG. 2 is a plan diagram of an example of the metal gasket according to the first embodiment of the present invention depicted in FIG. 1.
Figure 3:
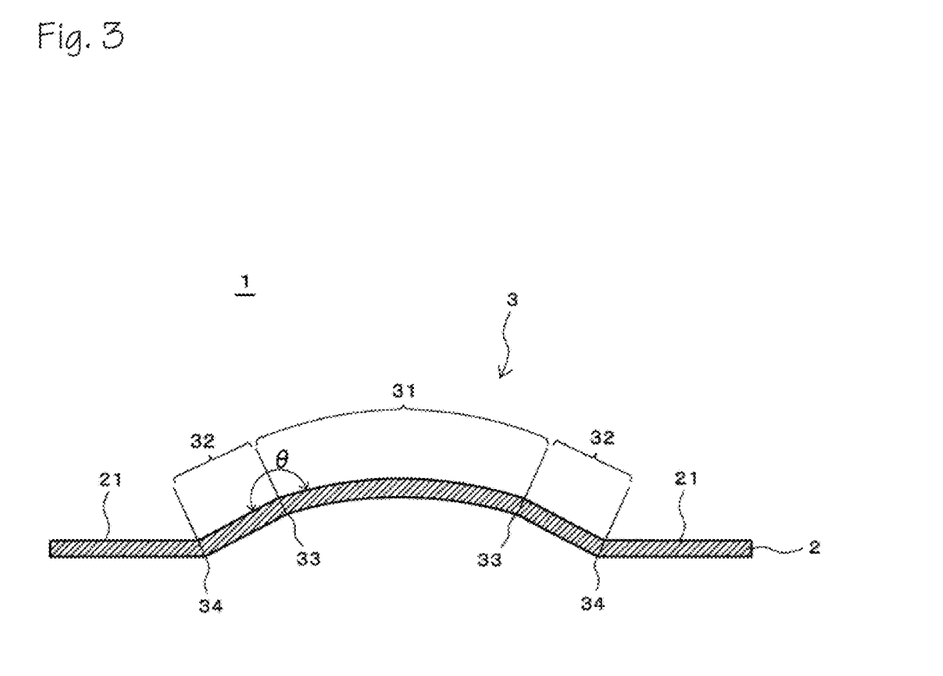
FIG. 3 is an enlarged cross-sectional diagram taken along a (iii)-(iii) line in FIG. 2.
Figure 4A:
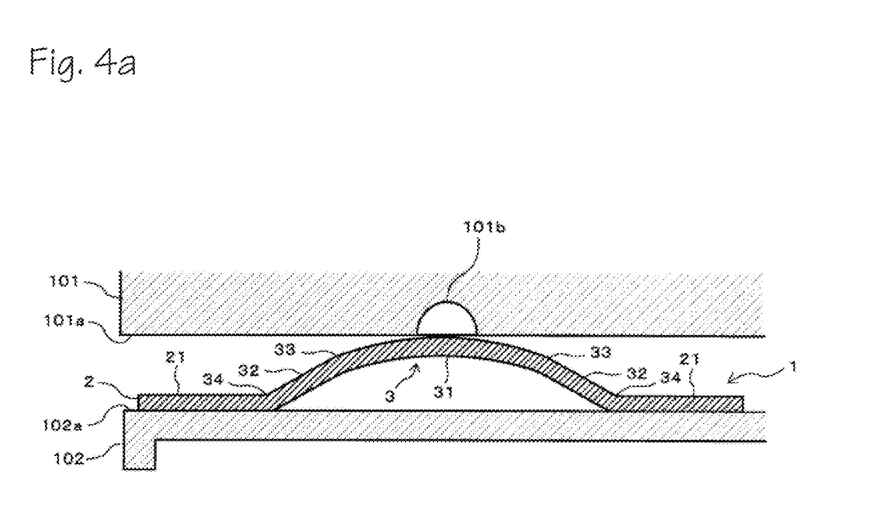
FIG. 4A is a cross-sectional diagram of the state of the metal gasket depicted in FIG. 2 arranged on a sealing face and not yet compressed.
Figure 4B:
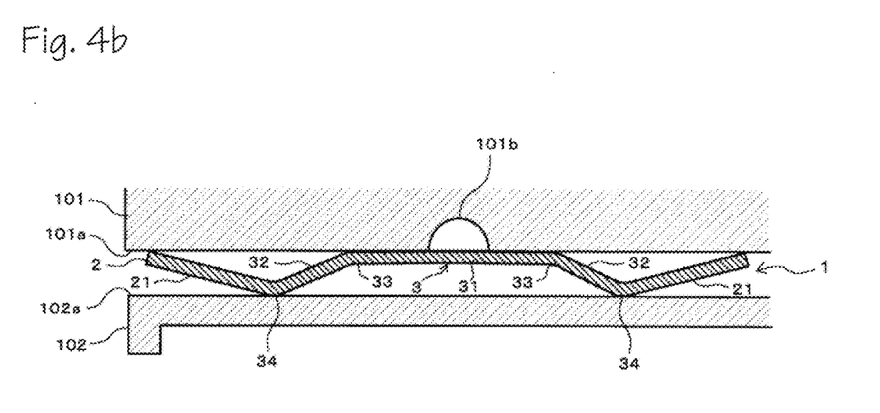
FIG. 4B is a cross-sectional diagram of the state of the metal gasket depicted in FIG. 2 arranged on the sealing face and compressed.

FIG. 1 is an exploded perspective diagram of a housing to which a metal gasket according to the first embodiment of the present invention is applied. FIG. 2 is a plan diagram of an example of the metal gasket according to the first embodiment of the present invention depicted in FIG. 1. FIG. 3 is an enlarged cross-sectional diagram taken along a (iii)-(iii) line in FIG. 2. FIG. 4A is a cross-sectional diagram of the state of the metal gasket depicted in FIG. 2 arranged on a sealing face and not yet compressed, and FIG. 4B is a cross-sectional diagram of the state of the metal gasket depicted in FIG. 2 arranged on the sealing face and compressed.

The housing 100 depicted in FIG. 1 includes two members that are a lid member 101 including a cast component of aluminum or the like, and a case member 102 including a non-cast component. For the lid member 101 and the case member 102, faces disposed around openings thereof are set to be sealing faces 101a and 102a, and one metal gasket 1 is arranged between the sealing faces 101a and 102a to be sandwiched thereby. The lid member 101 and the case member 102 are clamped together to each other by bolts 103, and the metal gasket 1 is thereby compressed to establish sealing between the sealing faces 101a and 102a from the fluid to be hermetically accommodated.

As depicted in FIG. 2, the metal gasket 1 includes a gasket main body 2 including a metal substrate of, for example, stainless steel, a cold-rolled steel plate, a zinc-coated steel plate, aluminum plywood, or the like, a bead portion 3 disposed for the overall circumference of the gasket main body 2, and proper number of bolt holes 4 through which bolts 103 are inserted.

The detailed structure of the metal gasket 1 will further be described with reference to FIG. 3. FIG. 3 depicts the metal gasket 1 that is not yet compressed with no load applied thereto.

The metal gasket 1 has the bead portion 3 formed between two flat portions 21 and 21 that are formed by the gasket main body 2. The bead portion 3 has a cross-sectional shape formed into a shape to have an arc portion 31 that protrudes in a convex on one side face of the gasket main body 2 and hem-rising portions 32 and 32 that each obliquely rise from the gasket main body 2 (the flat portion 21) toward the arc portion 31, on both hem portions of the arc portion 31.

The arc portion 31 and the hem-rising portion 32 are smoothly connected while a connection portion 33 between the arc portion 31 and the hem-rising portion 32 is formed to be convex toward the convex side of the bead portion 3 (upward in FIG. 3). An angle θ formed by the arc portion 31 and the hem-rising portion 32 on the convex side of the bead portion 3 is greater than 180°. The bead portion 3 is formed for the slope to become slightly mild around the end of the hem-rising portions 32 and the start of the arc portion 31.

The hem-rising portion 32 is not limited to the one that is formed with a cross-sectional shape as a straight oblique side portion, and may be formed as an oblique side portion having a curve (an arc) shape that is slightly convex toward the convex side of the bead portion 3. It can also be described that the bead portion 3 includes the arc portion 31 whose curvature is greater than that of the hem-rising portion 32 and the hem-rising portions 32 whose curvature is smaller than that of the arc portion 31 or whose curvature is zero.

A reference numeral "34" denotes a connection portion between the flat portion 21 and the hem-rising portion 32.

As depicted in FIG. 4A, the metal gasket 1 is attached between the sealing faces 101a and 102a such that the convex of the bead portion 3 faces the sealing face 101a of the lid member 101 that is a cast component. The lid member 101 and the case member 102 are clamped by the bolts 103 with the metal gasket 1 sandwiched therebetween and the bolt axis forces thereby act on the metal gasket 1 for the bead portion 3 to be compressed as depicted in FIG. 4B. The arc portion 31 is thereby pressed to the sealing face 101a to be downwardly warp-deformed between the connection portions 33 and 33, and forms a flat face along the sealing face 101a. The bead portion 3 therefore forms a wide contact width for the overall width of the arc portion 31 sandwiched by the connection portions 33 and 33 for the sealing face 101a.

The configuration having the bead portion 3 that forms the wide contact width will further be described.

Figure 5A:
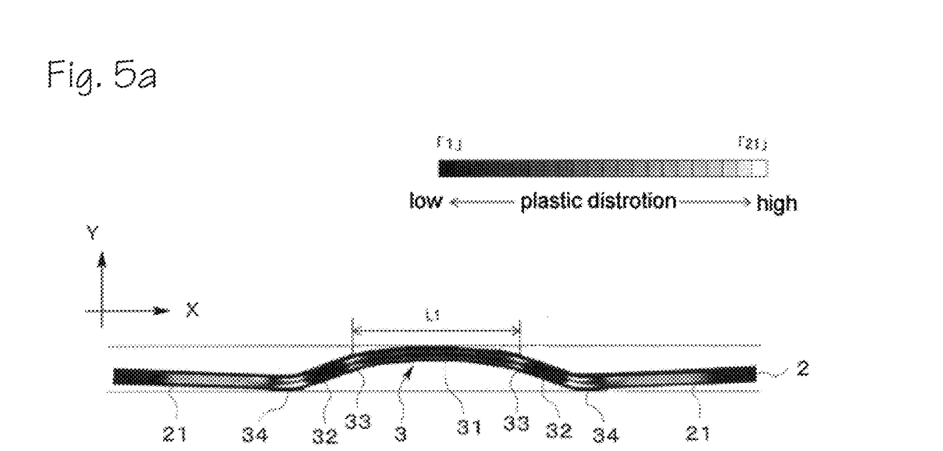
FIG. 5A is a diagram of a result of an FEM analysis of plastic distortion of the metal gasket depicted in FIG. 2 that is not compressed.
Figure 5B:
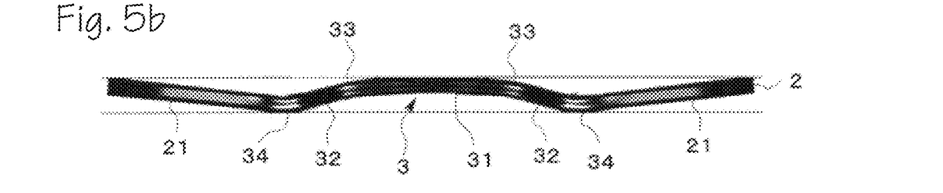
FIG. 5B is a diagram of a result of the FEM analysis of the plastic distortion of the metal gasket depicted in FIG. 2 that is compressed.

FIG. 5 depict a result of an FEM analysis of the plastic distortion in the state where the metal gasket 1 according to the present invention is compressed. FIG. 5A depicts the state where the metal gasket 1 is not yet compressed, and FIG. 5B depicts the state where the gasket 1 is compressed.

The plastic distortion is indicated using colors in 21 levels while, hereinafter, the plastic distortion will herein be represented by numerical values in 21 levels using "1" as the lowest value and "21" as the highest value.

As can be seen from FIG. 5A, the bead portion 3 of the metal gasket 1 that is not yet compressed has plastic distortion that is higher than that of the arc portion 31 in each of the connection portions 33 and 33 between the arc portion 31 and the hem-rising portions 32 and 32, and the connection portions 34 and 34 between the flat portions 21 and 21, and the hem-rising portions 32 and 32. The metal gasket 1 has a shape having the value of the plastic distortion for the overall width of the arc portion 31 lower than the value of the plastic distortion in the connection portions 33 and 34. For example, the level of the plastic distortion of each of the connection portions 33 and 34 is "20" and the level of the plastic distortion of the arc portion 31 is "5" for the overall width thereof. High plastic distortion in a portion means that work hardening currently progresses in the portion, and indicates that a larger force is necessary to deform the portion.

From the viewpoint of the work hardening by the plastic deformation, in the metal gasket 1, the arc portion 31 of the bead portion 3 can easily be deformed compared to the connection portions 33, 33, 34, and 34. The arc portion 31 and the connection portions 33, 33, 34, and 34 all therefore start to be deformed when the bead portion 3 is compressed while the amounts of deformation of the arc portion 31 and the connection portions 33, 33, 34, and 34 are not even and a difference is generated in the amount of deformation therebetween because of the difference in the work hardening therebetween.

The connection portions 33, 33, 34, and 34 whose work hardening further progresses each have the smaller amount of deformation compared to that of the arc portion 31. The amount of deformation in an X-direction (the width direction) is therefore suppressed for the arc portion 31 sandwiched by the connection portions 33 and 33 of the above connection portions. The arc portion 31 is thereby smoothly deformed from the arc shape before the compression to the straight line shape depicted in FIG. 5B. The overall arc portion 31 thereby forms the flat face and an excellent contact width property is achieved for the overall width.

As depicted in FIG. 4, according to the metal gasket 1 of the present invention, a recess 101b can be closed by the arc portion 31 during the compression that is in contact therewith for the wide contact width even when the recess 101b is formed by a blow hole in the sealing face 101a of the lid portion 101 including the cast component and is present in the contact face with the bead portion 3.

A contact pressure distribution acquired when the arc portion 31 is compressed will be described.

Figure 6:
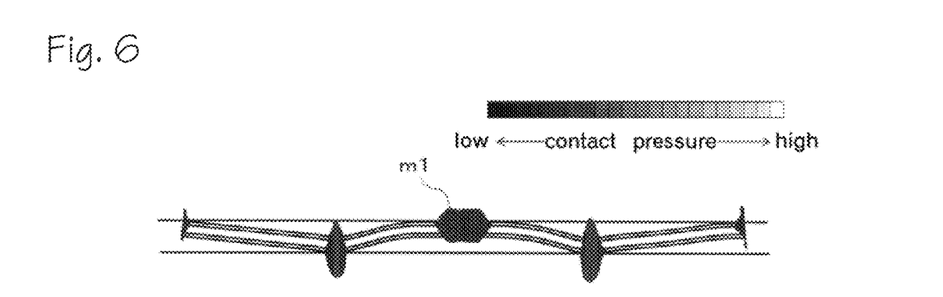
FIG. 6 is a diagram of a result of an analysis of the contact pressure distribution of the metal gasket depicted in FIG. 2 that is compressed.

FIG. 6 depicts a result of an FEM analysis of the contact pressure distribution acquired when the metal gasket 1 is compressed. The contact pressure distribution has a wider shape as the portion to which the contact pressure is applied during the compression is wider, and has a flatter shape as the contact pressure is more evenly applied.

As can be seen from FIG. 6, the contact pressure distribution m1 of the arc portion 31 acquired when the metal gasket 1 is compressed has a wide contact width formed in the width direction of the arc portion 31. The arc portion 31 of the metal gasket 1 has the wide contact pressure distribution when the metal gasket 1 is compressed. The contact pressure distribution m1 does not have any protruded portion along the arc portion 31 in its width direction, and has a substantially flat shape for the arc portion 31 in its width direction. The arc portion 31 forms an even contact pressure for the wide contact width.

As depicted in FIG. 4, even when the recess 101b is formed by the blow hole in the sealing face 101a of the lid portion 101 including the cast component, and the recess 101b is present in the contact face with the bead portion 3, according to the metal gasket 1 of the present invention, the contact pressure distribution of the arc portion 31 acquired when the metal gasket 1 is compressed, the contact compression distribution of the arc portion 31 acquired when the metal gasket 1 is compressed becomes the contact pressure distribution m1 having the flat and wide shape in the width direction and a stable closure state can be established by the contact pressure that is even for the overall recess 101b.

According to the metal gasket 1, the fluid to be hermetically accommodated does not leak to the exterior through the recess 101b and excellent sealing properties can be achieved by having the plastic distortion and the contact pressure distribution.

It is important that the bead portion 3 has the arc portion 31 between the hem-rising portions 32 and 32 in achieving the effect of the excellent sealing properties by the plastic distortion and the contact pressure distribution.

Figure 7:
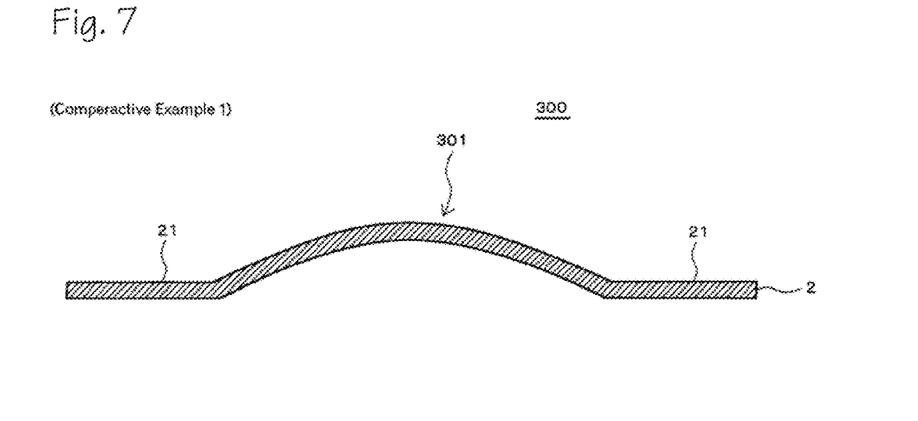
FIG. 7 is a cross-sectional diagram of a metal gasket (Comparative Example 1) whose bead portion is formed into a smooth mound shape.
Figure 8:
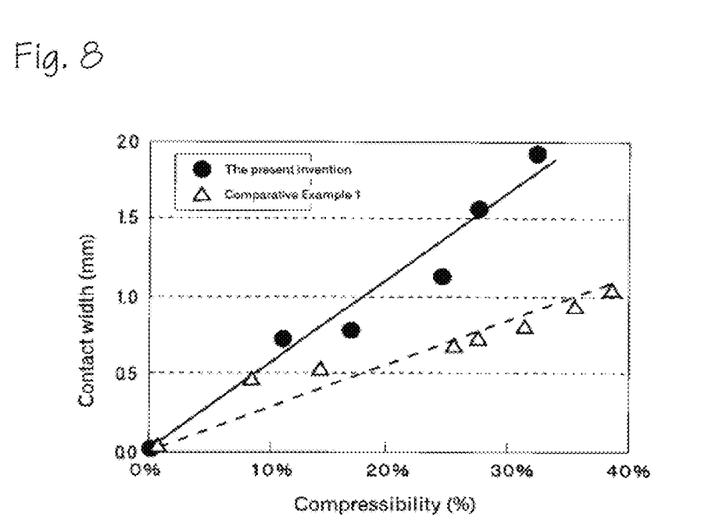
FIG. 8 is a graph of variation of a contact width acquired when the metal gaskets are compressed.

For comparison, FIG. 8 depicts a graph of variation of a contact width acquired when each of the metal gasket 1 according to the present invention and a metal gasket 300 (Comparative Example 1) having an ordinary full bead formed therein that has the same bead shape (the bead height and the bead width) equal to that of the bead portion 3 of the metal gasket 1 and that has a bead portion 301 formed protruding in a smooth mound shape from the flat portion 21 as depicted in FIG. 7 are compressed. The bead portion 301 of the metal gasket 300 of Comparative Example 1 has a bead shape not including the hem-rising portion 32 and the connection portion 33 of the metal gasket 1 according to the present invention. In FIG. 7, portions with the same reference numerals as those in FIG. 3 represent the portions of the same configurations as those in FIG. 3.

As can be seen from FIG. 8, the contact width of the metal gasket 1 according to the present invention including the arc portion 31 is increased as the metal gasket 1 is compressed compared to that of the metal gasket 300 of Comparative Example 1. The bead portion 301 of the metal gasket 300 of Comparative Example 1 cannot secure any wide contact width compared to the bead portion 3 of the metal gasket 1 according to the present invention. With the metal gasket 300, it is therefore difficult to completely close the recess caused by the blowhole using the bead portion 301.

Figure 9:
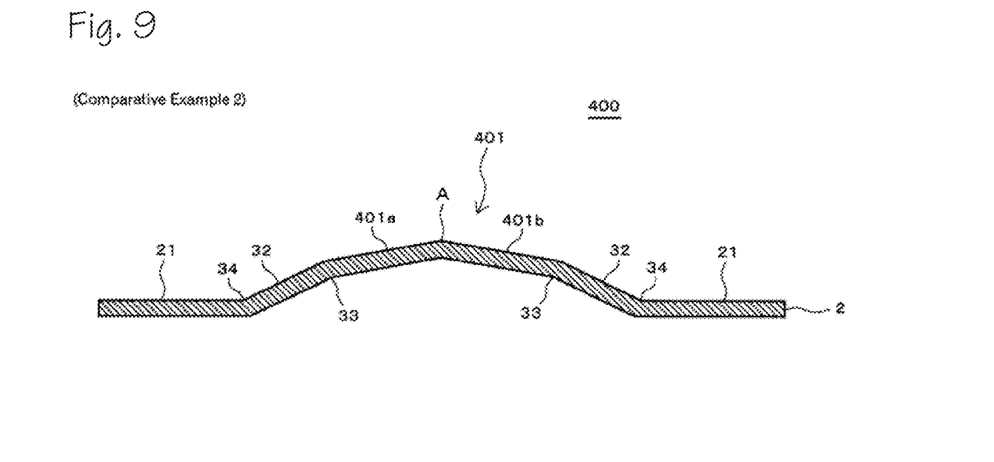
FIG. 9 is a cross-sectional diagram of a metal gasket (Comparative Example 2) whose bead portion is formed into a square mound shape.
Figure 10A:
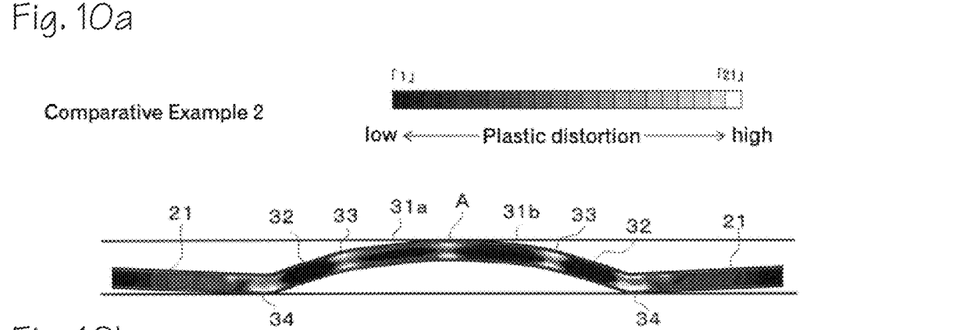
FIG. 10A is a diagram of a result of an analysis of plastic distortion of the metal gasket (Comparative Example 2) whose bead portion is formed into the square mound shape and that is not yet compressed.
Figure 10B:
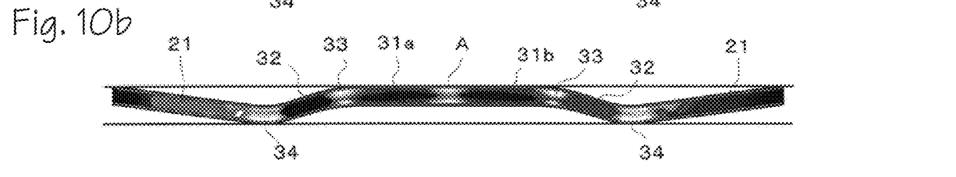
FIG. 10B is a diagram of a result of an analysis of plastic distortion of the metal gasket (Comparative Example 2) whose bead portion is formed into the square mound shape and that is compressed.
Figure 11:
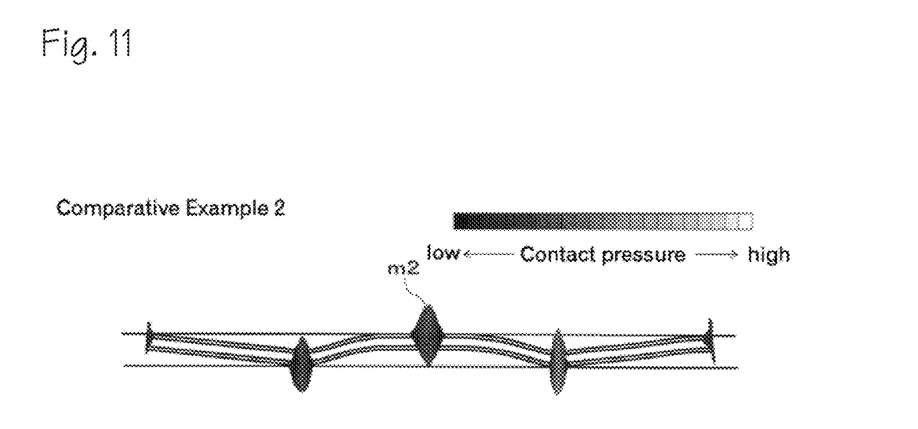
FIG. 11 is a diagram of a result of an analysis of the contact pressure distribution of the metal gasket (Comparative Example 2) whose bead portion is formed into the square mound shape and that is not yet compressed.

A metal gasket 400 is depicted in FIG. 9 (Comparative Example 2) such as a bead portion 401 formed by shaping only the portion of the arc portion 31 of the metal gasket 1 to be protruding in a square mound shape using two straight line portions 401a and 401b, FIG. 10 depict a result of an analysis on the plastic distortion distribution and FIG. 11 depicts a result of an analysis on the contact pressure distribution. FIG. 10A depicts the result for the gasket 400 that is not compressed and FIG. 10B depicts the result for the gasket 400 that is compressed. The metal gasket 400 including the bead portion 401 having the square mound shape depicted in FIG. 9 is the invention according to Japanese Patent No. 5450575. In FIG. 9 and FIG. 10, portions with the same reference numerals as those in FIG. 3 represent the portions of the same configuration as those in FIG. 3.

The result of the analysis on the plastic distortion in FIG. 10 and the analysis on the contact pressure distribution in FIG. 11 can be evaluated based on the same criteria as those for the cases of FIG. 5 and FIG. 6.

Based on the result depicted in FIG. 10, when the bead portion 401 having the square mound shape is formed, the plastic distortion is partially elevated also at a summit A of the mound shape. The value of the plastic distortion at the summit A of the mound shape is also "20" that is a high value similarly to those of the connection portions 33 and 34. As depicted in FIG. 11, it can be seen that a contact pressure distribution m2 has therefore a triangular shape having a narrow width and locally protruding at an acute angle at the summit A of the mound shape, and that the contact pressure distribution m2 cannot form the contact pressure distribution m1 having the flat and wide shape as that of the metal gasket 1 according to the present invention.

As above, with the bead portion 401 having the square mound shape as that of the metal gasket 400 of Comparative Example 2, the contact pressure distribution m2 having the triangular shape locally protruding at an acute angle at the summit A of the mound shape is acquired and the contact pressure at a point is extremely reduced as the point becomes distant from the summit A of the mound shape. Even when the recess caused by the blow hole in the counterpart sealing face can be covered by the bead portion 401 that is deformed, no closure with the contact pressure evenly applied to the overall recess can be established. When the pressure by the fluid to be hermetically accommodated is applied to the bead portion 401, the fluid to be hermetically accommodated may therefore easily get over the summit A of the mound shape to leak to the exterior through the recess.

Denoting the interval between the connection portions 33 and 33 with the high plastic distortion as "L1" (FIG. 5), for the bead portion 3 of the present invention, the contact width property of the arc portion 31 becomes more excellent as L1 become longer in the same bead shape (the bead width and the bead height).

The condition for sealing the recess 101b caused by the blow hole by closing the recess 101b using the arc portion 31 is "the contact width>the diameter of the blow hole×Fs" and, to establish this condition, L1 can be set at an appropriate length corresponding to an assumed diameter of the blow hole and it is typically set at 0.4 mm or longer.

The "diameter of the blow hole" refers to the diameter of the maximal blow hole in the cast component to be the counterpart member and the "Fs" refers to an adjustable parameter related to sealing pressure, sealing fluid, and coarseness of sealing face.

However, because the diameter of the blowhole generated in the cast component is often 1.5 mm or longer, preferably, the specific value of the interval between the connection portions 33 and 33 "L1" is 1.5 mm or longer from the viewpoint that the recess 101b caused by the blow hole can effectively be closed.

The width of the sealing face on the breadth of the gasket products is around 10 mm at the utmost from the viewpoint of downsizing and weight reduction of the unit. Therefore, the interval between the connection portions 33 and 33 "L1" can be the range of 0.4 mm to 10 mm. However, preferably, the interval between the connection portions 33 and 33 "L1" is around 8 mm or shorter in consideration of the breadth of the gasket products and the width of the sealing face.

Preferably, a specific curvature radius of the arc portion 31 of the bead portion 3 is 2 mm or longer. It is difficult to uniformly stipulate the curvature radius of the bead portion 3 because it has an influence on the width and height of the bead; however when the curvature radius is shorter than 2 mm, the superiority of the contact width property is degraded and an effective closure of the recess caused by a blow hole becomes difficult. In addition, the size of the products using gaskets and the connection width property of the bead portion 3 being taken into consideration, preferably, the curvature radius of the bead portion 3 is 20 mm or shorter.

Preferably, the length per side of the hem-rising portion 32 of the bead portion 3 (the length in the width direction along the slope) is one sixth or longer of the overall width of the bead portion 3 (the width of the bead portion 3 in the planar view thereof). This is because any deformation of the hem-rising portion 32 is suppressed against the deformation of the arc portion 31 in the compression status as the hem-rising portion is shorter, and a more excellent contact width property by the arc portion 31 can be achieved and, on the other hand, should the hem-rising portion 32 be shorter than one sixth of the overall width of the bead portion 3, the reaction property of gaskets grows greater, resulting in a remarkable degradation of compression property.

On the other hand, if the length per side of the hem-rising portion 32 of the bead portion 3 is longer than one third of the overall width of the bead portion 3, the more excellent contact width property cannot be easily achieved; therefore, preferably, the length is one third or shorter thereof.

Second Embodiment

The metal gasket 1 according to the first embodiment is applied to the case where the sealing face 101a of the lid member 101 to be the one component of the housing 100 is a cast component and the sealing face 102a of the case member 102 to be the other component thereof is a non-cast component while FIG. 12 to FIG. 15 depict a metal gasket according to the second embodiment advantageously applicable to the case where the counterpart sealing faces arranged on both sides of the gasket main body 2 are both cast components.

Figure 12:
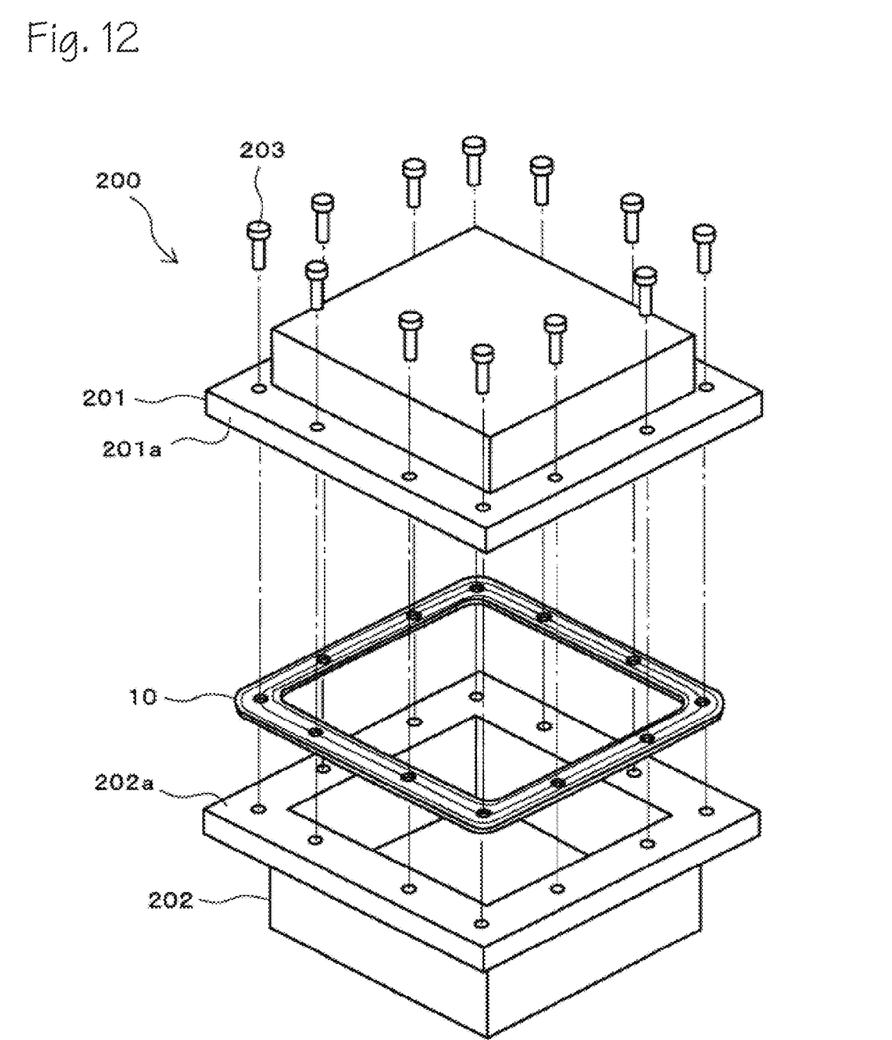
FIG. 12 is an exploded perspective diagram of a housing to which a metal gasket according to a second embodiment of the present invention is applied.
Figure 13:
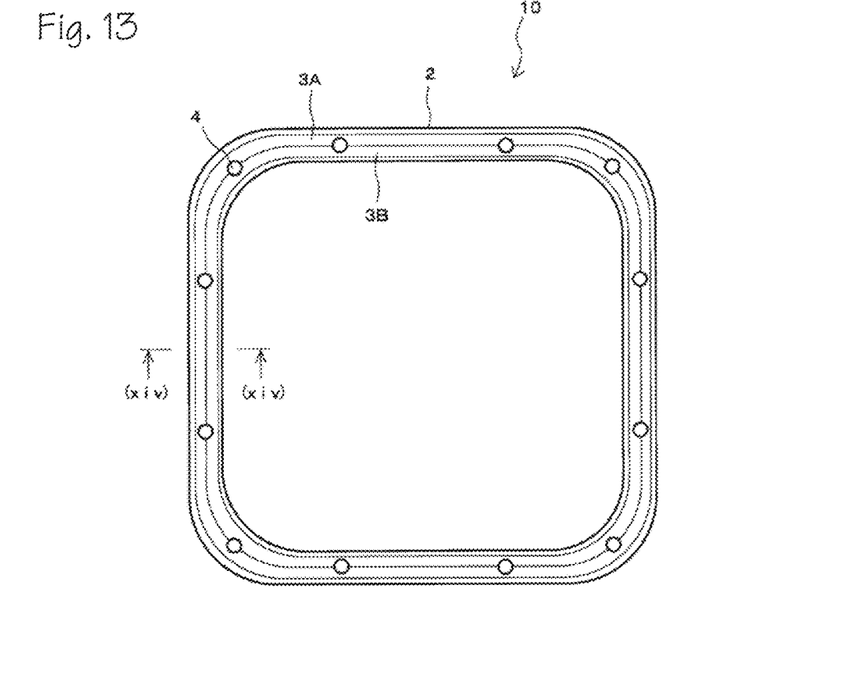
FIG. 13 is a plan diagram of an example of the metal gasket according to the second embodiment of the present invention depicted in FIG. 12.
Figure 14:
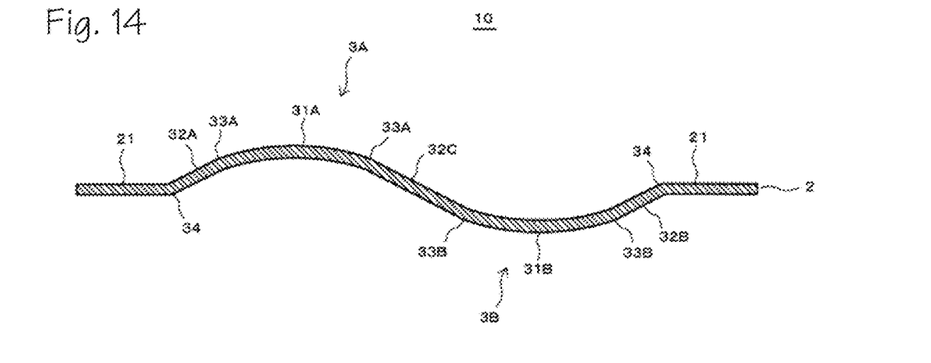
FIG. 14 is an enlarged cross-sectional diagram taken along a (xiv)-(xiv) line in FIG. 13.
Figure 15A:
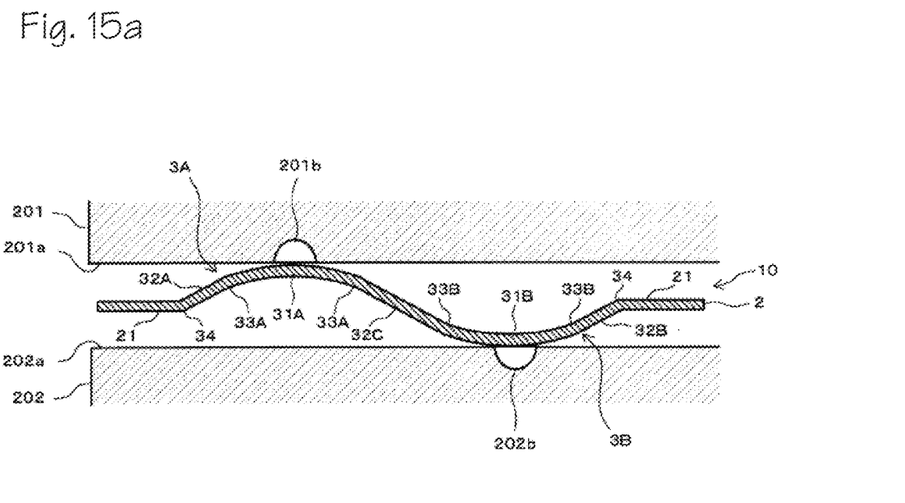
FIG. 15A is a cross-sectional diagram of the state of the metal gasket depicted in FIG. 13 arranged on a sealing face and not yet compressed.
Figure 15B:
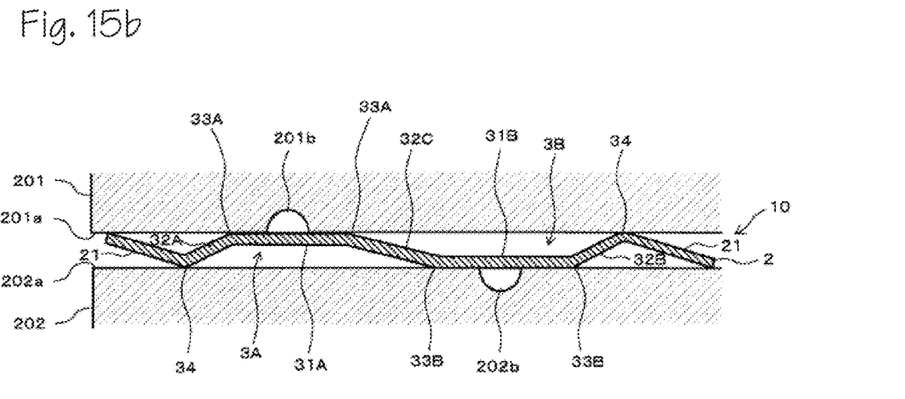
FIG. 15B is a cross-sectional diagram of the state of the metal gasket depicted in FIG. 13 arranged on the sealing face and compressed.

FIG. 12 is an exploded perspective diagram of a housing to which the metal gasket according to the second embodiment of the present invention is applied. FIG. 13 is a plan diagram of an example of the metal gasket according to the second embodiment of the present invention depicted in FIG. 12. FIG. 14 is an enlarged cross-sectional diagram taken along a (xiv)-(xiv) line in FIG. 13. FIG. 15A is a cross-sectional diagram of the state of the metal gasket depicted in FIG. 12, arranged on sealing faces and not yet compressed. FIG. 15B is a cross-sectional diagram of the state of the metal gasket depicted in FIG. 13, arranged on the sealing faces and compressed. Portions with the same reference numerals as those of the metal gasket 1 depicted in FIG. 1 to FIG. 3 represent the portions of the same configurations as those thereof and will not again be described by using the above description as their detailed description.

A housing 200 depicted in FIG. 12 includes two members that are a lid member 201 including a cast component of aluminum or the like, and a case member 202 also including a cast component of aluminum or the like. The housing 200 differs from the housing 100 in the first embodiment in that both of the lid member 201 and the case member 202 are cast components.

For the lid member 201 and the case member 202, the faces disposed around the openings thereof and facing each other are set to be sealing faces 201a and 202a, and one metal gasket 10 is arranged between the sealing faces 201a and 202a to be sandwiched thereby. The lid member 201 and the case member 202 are clamped together to each other by bolts 203. The metal gasket 10 is thereby compressed to seal an interface between the sealing faces 201a and 202a from the fluid to be hermetically accommodated.

The metal gasket 10 is different from the metal gasket 1 according to the first embodiment in that, as depicted in FIG. 14 and FIG. 15, bead portions 3A and 3B each to be convex are formed on both sides of the gasket main body 2. The bead portion 3A is formed to be convex toward the sealing face 201a of the lid member 201 depicted in the upper portion of the drawing, and the bead portion 3B is formed to be convex toward the sealing face 202a of the case member 202 depicted in the lower portion of the drawing.

Similarly to the bead portion 3 of the metal gasket 1, the bead portions 3A and 3B are formed to have cross-sectional shapes that include arc portions 31A and 31B, hem-rising portions 32A, 32B, and 32C of the hems of the arc portions 31A and 31B. The two hem-rising portions 32A and 32B are the hem-rising portions obliquely rising up from the gasket main body 2 (the flat portion 21) toward the arc portions 31A and 31B, and the one hem-rising portion 32C is the hem-rising portion that is shared between the two arc portions 31A and 31B. The bead portion 3A and the bead portion 3B have a shape for the bead portions 3A and 3B to be connected by the one hem-rising portion 32C arranged therebetween.

Connection portions 33A and 33A between the arc portion 31A and the hem-rising portions 32A and 32C are each formed to be convex toward the convex of the bead portion 3A (upward in FIG. 14) similarly to the connection portion 33 of the metal gasket 1. Connection portions 33B and 33B between the arc portion 31B and the hem-rising portions 32B and 32C are each formed to be convex toward the convex of the bead portion 3B (downward in FIG. 14) similarly to the connection portion 33 of the metal gasket 1.

As depicted in FIG. 15A, the metal gasket 10 is attached between the sealing faces 201a and 202a. The one bead portion 3A is arranged to be convex toward the sealing face 201a of the lid member 201 and the other bead portion 3B is arranged to be convex toward the sealing face 202a of the case member 202. The lid member 201 and the case member 202 are clamped together to each other by bolts 203 sandwiching the metal gasket 10, and the bolt axis forces thereby act on the metal gasket 10 for the bead portions 3A and 3B to be compressed as depicted in FIG. 15B.

Figure 16:
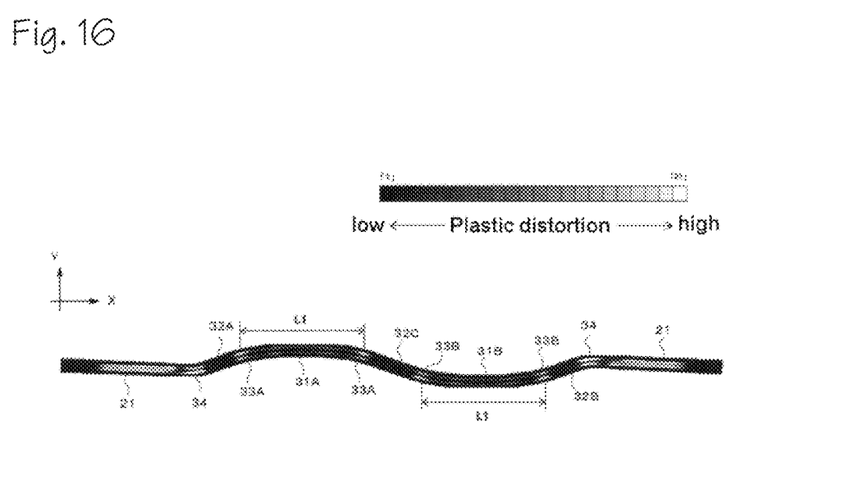
FIG. 16 is a diagram of a result of an FEM analysis of plastic distortion of the metal gasket depicted in FIG. 14 that is compressed.

Similarly to the bead portion 3 of the metal gasket 1, the bead portions 3A and 3B of the metal gasket 10 has a plastic distortion distribution that is lower for the overall widths of the arc portions 31A and 31B than that of the connection portions 33A, 33B, and 34 as depicted in FIG. 16. When the metal gasket 10 is compressed, the arc portions 31A and 31B are therefore pressed to the sealing faces 201a and 202a to be warp-deformed between the connection portions 33A and 33B to form flat portions along the sealing faces 201a and 202a similarly to the arc portion 31 of the metal gasket 1. The bead portions 3A and 3B therefore form a wide contact width for the overall widths of the arc portions 31A and 31B sandwiched by the connection portions 33A and 33B.

The arc portions 31A and 31B in their compression state as above each deform similarly to the arc portion 31 of the metal gasket 1 to each achieve an excellent contact width property. Though not depicted, it can therefore easily be understood that the contact pressure distribution of each of the arc portions 31A and 31B becomes a contact pressure distribution that is flat and wide in the width direction similarly to the contact pressure distribution m1 (see FIG. 6) of the arc portion 31 of the metal gasket 1. The metal gasket 10 therefore also forms the contact pressure that is even for a wide contact width for the sealing faces 201a and 202a to which the arc portions 31A and 31B respectively correspond.

According to the metal gasket 10, as depicted in FIG. 15, even when recesses 201b and 202b caused by the blow holes are present in the sealing faces 201a and 202a that are the cast components, the arc portions 31A and 31B of the bead portions 3A and 3B each function similarly to the arc portion 31 of the metal gasket 1 to form the contact pressure that is even for the wide contact width for the sealing faces 201a and 202a. The recesses 201b and 202b can therefore be stably closed and excellent sealing properties can be achieved.

The metal gasket 10 has the bead portions 3A and 3B formed on both sides of the gasket main body 2 and any one of the faces of the gasket main body 2 can therefore be used as the upper side or the lower side when the gasket 10 is attached between the sealing faces 201a and 202b, and the orientation of the metal gasket 10 does not need to be selected. The attachment workability thereof is therefore also excellent.

Other Embodiments

The metal gaskets 1 and 10 can each be used as a what-is-called rubber coated metal gasket whose gasket main body 2 is coated with an elastic substance. Because the rubber coated metal gasket includes the elastic substance on the surface thereof, further excellent sealing properties can be achieved by the elastic deformation of the elastic substance even when the counterpart sealing face is a rough face.

For example, nitrile rubber, styrene-butadiene rubber, fluorine-containing rubber, acrylic rubber, and silicon rubber are usable each as the elastic substance. Any one of these elastic substances may be used alone or a synthetic rubber (including a foamed rubber) including at least any one of the above elastic substances may be used.

When the elastic substance is coated, preferably, a surface treatment layer to achieve an excellent adhesion property of the elastic substance is disposed on the surface of the gasket main body 2.

EXPLANATIONS OF LETTERS OR NUMERALS 1, 10 metal gasket
2 gasket main body
21 flat portion
3, 3A, 3B bead portion
31, 31A, 31B arc portion
32, 32A, 32B, 32C hem-rising portion
33, 33A, 33B connection portion
34 connection portion
4 bolt hole
100, 200 housing
101a, 102a, 201a, 202a sealing face
101b, 201b, 202b recess
300 metal gasket (Comparative Example 1)
301 bead portion
400 metal gasket (Comparative Example 2)
401a, 401b straight line portion
401 bead portion
A summit of the mound shape
m1, m2 contact pressure distribution

What is claimed is:

1. A metal gasket comprising a bead portion to be in contact with a counterpart sealing face to form a sealing portion, formed on a gasket main body, wherein in a non-compressed state the bead portion comprises an arc portion that is convex toward the counterpart sealing face, and straight hem-rising portions that obliquely rise from the gasket main body to the arc portion, so that a plastic distortion of the connection portion is higher than a plastic distortion of the arc portion, wherein a connection portion between the arc portion and the hem-rising portion is formed to be convex toward a convex side of the bead portion, wherein the bead portion is deformed by being compressed so that stress generated by the bead portion seals the counterpart sealing face, wherein in a compressed state, an arc portion is pressed to the counterpart sealing face to be deformed between a connection portion to form a flat face along the counterpart sealing face.

2. The metal gasket according to claim 1, wherein a length per one side of the hem-rising portion is the range of one sixth to one third of an overall width of the bead portion.

3. The metal gasket according to claim 1, wherein the gasket main body is coated with an elastic substance.

4. A metal gasket comprising a first bead portion in contact with one counterpart sealing face to form a sealing portion and a second bead portion in contact with a second counterpart sealing face to form a second sealing portion, so that the sealing portions are formed on both sides of a gasket main body, wherein in a non-compressed state the bead portion comprises an arc portion that is convex toward the counterpart sealing face, and straight hem-rising portions that obliquely rise from the gasket main body to the arc portion, and straight hem-rising portions that are arranged between each of the arc portions, so that plastic distortion of the connection portion is higher than plastic distortion of the arc portion, and wherein a connection portion between the arc portion and the hem-rising portion is formed to be convex toward a convex side of the bead portion, wherein each of the bead portions is deformed by being compressed and stress generated in each of the bead portion seals and each of the counterpart sealing faces, wherein in a compressed state, an arc portion is pressed to the counterpart sealing face to be deformed between a connection portion to form a flat face along the counterpart sealing face.

5. The metal gasket according to claim 4, wherein a length per one side of the hem-rising portion is the range of one sixth to one third of an overall width of the bead portion.

6. The metal gasket according to claim 4, wherein the gasket main body is coated with an elastic substance.

* * * * *